United States Patent
Boyer et al.

(10) Patent No.: US 6,647,947 B2
(45) Date of Patent: Nov. 18, 2003

(54) STRATEGY AND CONTROL SYSTEM FOR DEACTIVATION AND REACTIVATION OF CYLINDERS OF A VARIABLE DISPLACEMENT ENGINE

(75) Inventors: Bradley Alan Boyer, Canton, MI (US); Thomas William Megli, Dearborn, MI (US); William F. Stockhausen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 10/063,016

(22) Filed: Mar. 12, 2002

(65) Prior Publication Data

US 2003/0172900 A1 Sep. 18, 2003

(51) Int. Cl.[7] ................................. F01L 13/00
(52) U.S. Cl. ................................... 123/198 F
(58) Field of Search .................. 123/198 F, 90.15

(56) References Cited

U.S. PATENT DOCUMENTS

| | | |
|---|---|---|
| 5,408,966 A * 4/1995 | Lipinski et al. | 123/198 F |
| 5,460,129 A * 10/1995 | Miller et al. | 123/198 F |
| 5,467,748 A 11/1995 | Stockhausen | |
| 5,642,703 A 7/1997 | Stockhausen et al. | |
| 5,803,040 A 9/1998 | Biesinger et al. | |
| 5,934,263 A 8/1999 | Russ et al. | |
| 6,237,559 B1 5/2001 | Russ et al. | |
| 6,276,138 B1 * 8/2001 | Welch | 123/198 F |
| 6,332,445 B1 * 12/2001 | Voss et al. | 123/198 F |
| 6,341,594 B1 * 1/2002 | Linden | 123/352 |
| 6,382,193 B1 * 5/2002 | Boyer et al. | 123/560 |
| 6,499,449 B2 * 12/2002 | Michelini et al. | 123/90.15 |
| 6,546,910 B2 * 4/2003 | Tanaka et al. | 123/198 F |
| 6,561,145 B1 * 5/2003 | Stockhausen et al. | 123/198 F |

* cited by examiner

Primary Examiner—Tony M. Argenbright
Assistant Examiner—Jason Benton
(74) Attorney, Agent, or Firm—Brooks & Kushman; Carlos L. Hanze (57) ABSTRACT

A strategy and control system for a variable displacement engine in which cylinder deactivation is obtained by intake cam phasing and exhaust valve deactivation. Fuel control for the engine and spark deactivation are sequenced with valve deactivation to avoid transferring engine exhaust gases to the intake manifold of the engine during a transition between full cylinder operation and partial cylinder operation. Excess air flow through the exhaust system for the engine is avoided during a transition from partial cylinder operation to full cylinder operation. These features achieve stable engine performance during the transition.

23 Claims, 8 Drawing Sheets

STRATEGY AND CONTROL SYSTEM FOR DEACTIVATION AND REACTIVATION OF CYLINDERS OF A VARIABLE DISPLACEMENT ENGINE

BACKGROUND OF INVENTION

1. Field of the Invention

The invention relates to automotive engines with multiple cylinders in which a variable displacement characteristic is achieved by activating and deactivating groups of cylinders.

2. Background Art

A multiple-cylinder internal combustion engine in an automotive powertrain usually operates with a four-stroke cycle over a wide speed range and a wide load range. The engine is most efficient when operating with a relatively high load since throttling losses at the air intake are reduced when the engine throttle is at an advanced setting. In order to avoid long-term operation with partial load, it is known design practice to deactivate some of the cylinders of the multiple-cylinder engine so that the active cylinders can be operated at an advanced throttle setting.

One technique for the deactivation of selected cylinders to achieve a variable effective displacement of the engine is to deactivate both the intake and exhaust valves of one or more of the cylinders along with spark and fuel deactivation. This traps air in the deactivated cylinders as the engine operates in its normal four-stroke cycle. The air in the deactivated cylinders is alternately compressed and expanded generally isentropically so that pneumatic spring energy absorbed during the compression stroke is restored as useful work during the expansion stroke. Although friction and thermodynamic losses tend to decrease engine efficiency during operation of the engine with selected cylinders deactivated, that decrease in efficiency is much smaller than the increased efficiency of the active cylinders.

Known variable displacement engine systems that disable both the intake and exhaust valves for the cylinders must, of necessity, carry the cost penalty of the added valve control hardware that is required. An example of an engine with selective cylinder deactivation is described in prior art U.S. Pat. No. 5,934,263. The engine of the '263 patent includes a multiple-cylinder engine capable of operating on fewer than a full number of cylinders wherein the engine has separate banks of cylinders and an actuator mechanism to equally phase shift the intake and exhaust valves for the cylinders to be deactivated. The valves of the deactivated cylinders can be controlled by dual overhead camshafts or by a single overhead camshaft, but in either case the cam actuators are mechanically linked together. The deactivated cylinders pump exhaust gas back through exhaust valves into a common intake air plenum, which in turn acts as a source of EGR gas for the active cylinders.

Prior art U.S. Pat. No. 5,642,703 discloses a variable displacement engine design in which exhaust valves are deactivated in conjunction with intake cam phasing. This equalizes air flow across the disabled cylinders. It achieves significant cost savings because of the elimination of intake valve deactivators. A cam phase shift of about 60° in the retard direction, for example, minimizes the pumping losses of the deactivated cylinders.

SUMMARY OF INVENTION

Variable displacement engine operation requires carefully sequenced operation of the fuel injectors, spark timing, valve deactivators, electronic throttle actuator, and variable camshaft timing actuators to achieve transitions between cylinder deactivation operating mode and full cylinder activation operating mode. There is a need, however, for providing a smooth transition between the modes in order to minimize disturbances in the effective engine output torque. It is also necessary to carefully control the air-fuel ratio and residual gas levels in the operating cylinders during the transition in order to avoid misfiring during reactivation and to avoid discharge of excessive exhaust gas emissions.

The present invention provides a transition strategy for a control method and a control system to obtain two operating modes by deactivating cylinders through a combination of exhaust valve deactivation and intake cam phasing. It is applicable to an engine having separate banks of cylinders that have different intake cam phasing requirements for the active and inactive cylinders.

A transition from a first operating mode to a second operating mode is achieved by retarding the timing of the intake valve closing event and the intake valve opening event so that the events are approximately equidistant from a top-dead-center position of a piston in a variable displacement engine cylinder. The transition occurs during a so-called torque control region of a time plot, which is followed by a cylinder deactivation region.

The throttle opening is increased during the transition to increase torque of the non-variable displacement cylinders. Camshaft timing is advanced to increase torque for the non-variable displacement cylinders during the transition while retarding camshaft timing and spark timing to reduce torque for the variable displacement cylinders. The exhaust valve, fuel injector, and spark are deactivated for the variable displacement cylinders during a torque control region of the transition. This occurs during one full engine cycle.

Another feature of the invention is the ability of the strategy to control camshaft timing so that the camshaft is phased early in the torque control region before the start of the cylinder deactivation region. This reduces any engine noise that might occur due to rapid expansion of compressed air in the cylinders back into the intake manifold when the intake valve opens.

DETAILED DESCRIPTION

For the purpose of describing the differences between the present invention and prior art variable displacement engine concepts, the transition strategy for transitions between full cylinder activation operation and operation with one cylinder bank deactivated will be described.

It will be assumed that the engine is a ten-cylinder, twin-bank engine and that it is first in the full cylinder activation mode. It then goes through a transition to a five cylinder activation mode. One of the cylinders is illustrated at 10 in FIG. 1a. It includes a piston 12 that reciprocates in cylinder 14. The piston and cylinder define a combustion chamber 16. An air-fuel mixture in the combustion chamber 16 is ignited by an igniter 18.

Figure 1A:
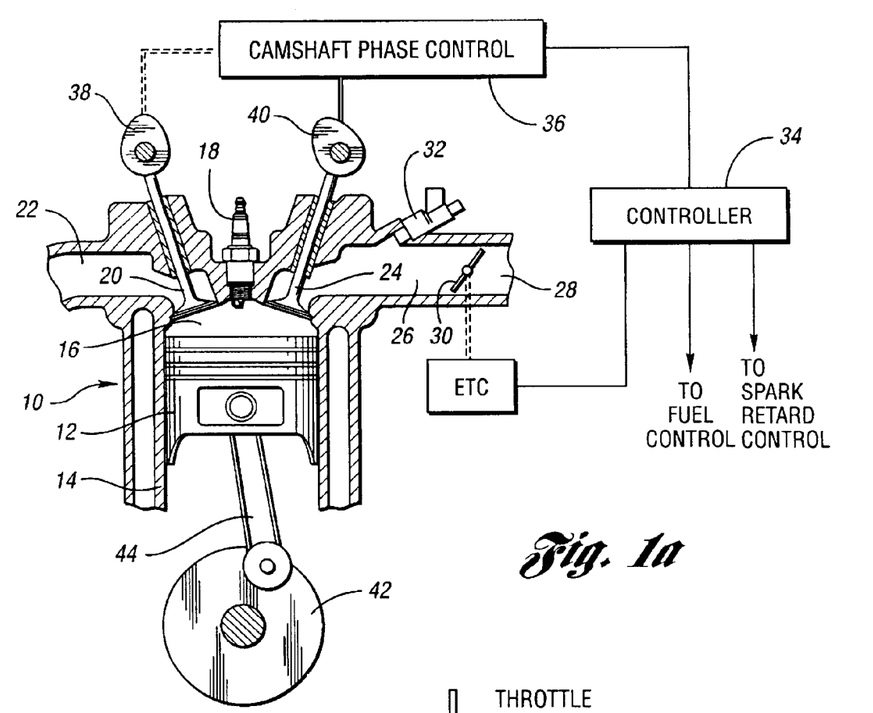
FIG. 1a is a schematic cross-sectional view of a variable displacement engine control system of the invention, including an illustration of one of the multiple cylinders.

An exhaust valve 20 controls distribution of exhaust gases from combustion chamber 16 to exhaust manifold 22. An intake valve 24 controls distribution of an air-fuel mixture to the combustion chamber 16 from intake manifold 26. Air is distributed to the manifold 26 from air intake 28. A throttle valve 30 controls delivery of air to the combustion chamber 16.

A fuel injector 32, under the control of an electronic engine controller 34, distributes fuel through the manifold 26 on the upstream side of the valve 24. The controller includes a digital processor for developing control signals for a camshaft phase control, a fuel control, a spark control and a throttle control using sensor data and a programmed algorithm stored in memory.

The controller 34 responds to engine variables, including engine manifold pressure, throttle position, temperature, ambient pressure, temperature, etc. to produce an input control signal for camshaft phase control 36. This affects the phase of exhaust valve cam 38 and intake valve cam 40.

The piston 10 is connected to crankshaft assembly 42 by piston rod 44 in known fashion.

Figure 1B:
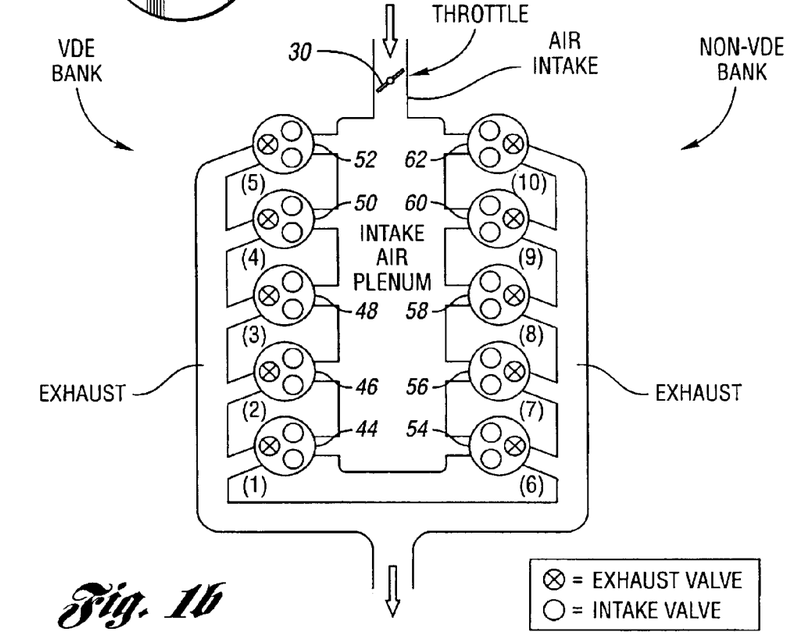
FIG. 1b is a schematic representation of a common intake air manifold and an exhaust manifold for a twin bank engine, one bank having variable displacement cylinders and the other bank having non-variable displacement cylinders.

FIG. 1b shows schematically two banks of engine cylinders. The first bank comprises cylinders 1, 2, 3, 4, and 5, as shown at 44, 46, 48, 50, and 52. A second bank, which is a non-variable displacement engine bank, includes cylinders 6, 7, 8, 9, and 10. These are shown at 54, 56, 58, 60, and 62. Each cylinder, as illustrated in FIG. 1b, may comprise two intake valves and a single exhaust valve, as schematically shown. The bank of cylinders 1 through 5 is a variable displacement engine bank.

Figure 2A:
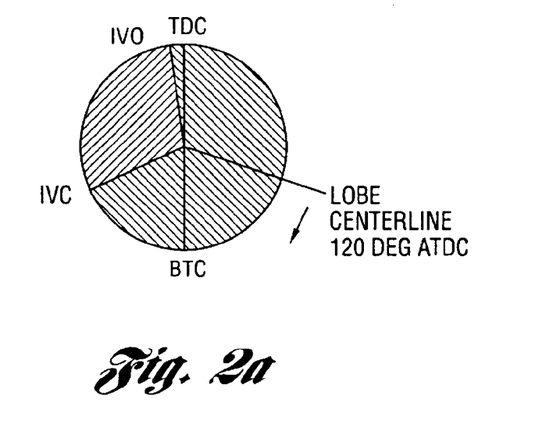
FIG. 2a is a base intake valve timing diagram for a conventional piston engine.
Figure 2B:
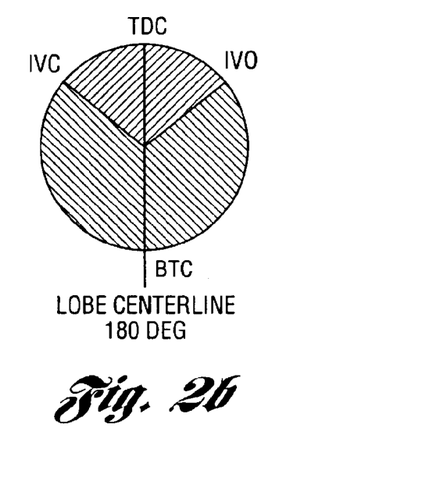
FIG. 2b is an intake valve timing diagram for a variable displacement piston engine with intake cam phasing.

FIG. 2a shows the clock timing diagram for phasing the intake event for a base engine. This is compared in FIG. 2b with the corresponding clock timing diagram for intake cam phasing of a variable displacement cylinder deactivation event. The intake event duration for a base engine is about 260°, as indicated in FIG. 2a. The cam lobe centerline is at 120° after top-dead-center for the intake stroke. The intake valve opening, in the case of the base engine diagram of FIG. 2a, is approximately 10° before top-dead-center; and the intake valve closing (IVC) is at 70° after bottom-dead-center. When the cylinder is deactivated, the intake event is retarded about 60°, as shown in FIG. 2b. The intake event centers at about bottom-dead-center.

As the piston moves down during the intake stroke, trapped gases expand until the intake valve opening occurs at about 50° after top-dead-center. Gas is then drawn in from the intake manifold until the piston reaches bottom-dead-center. A roughly equal amount of gas is then pushed back out of the cylinder into the intake port and manifold during the compression stroke due to the late intake valve closing at about 50° before top-dead-center. This minimizes the net pumping losses because the intake manifold and the in-cylinder pressures will roughly match at the intake valve opening. There is a net pumping loss decrease due to the lack of sudden expansion of gas across the intake valve.

Figure 3:
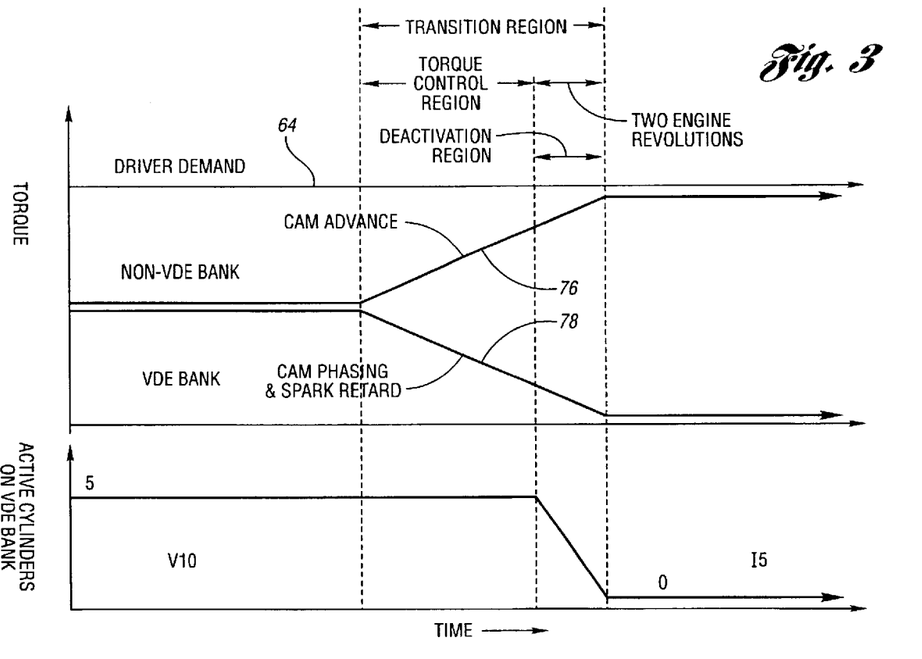
FIG. 3 is a time plot of torque and of the number of active cylinders for the engine of the invention.

The strategy of the present invention is concerned with a transition between the two engine operating modes. FIG. 3 shows a constant torque demand cylinder deactivation event during a transition from ten cylinder operation to five cylinder operation. The transition is divided into two regions: the torque control region and the deactivation region. In the torque control region, shown in FIG. 3, all cylinders are firing. The electronically controlled throttle 30 is open to increase torque on the non-variable displacement engine bank of cylinders 6 through 10. The variable camshaft timing and spark timing are controlled separately on each bank by the controller 34 to reduce torque on the variable displacement engine cylinder banks 1 through 5, and to increase torque on the non-variable displacement engine cylinder bank.

The length of the torque control region is controlled by the time constants for the throttle and the variable camshaft timing actuators, which may be several engine cycles depending on the engine speed and load.

The deactivation region within the transition region is a region in which the valves, the fuel injectors, and the ignition signals are deactivated in a known firing order sequence [i.e., (1), (5), (2), (3), (4)]. This occurs during one engine cycle, or two revolutions of the engine.

Figure 4:
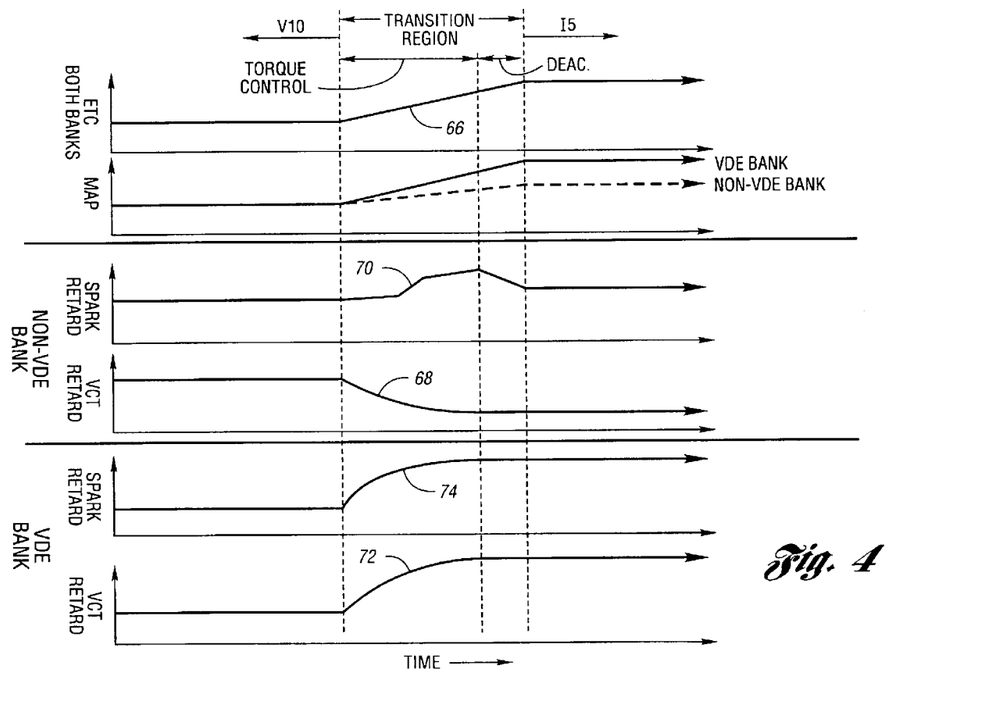
FIG. 4 is a time plot for variable camshaft timing retard and spark timing retard phase for both a variable displacement engine bank and a non-variable displacement engine bank, together with plots of manifold pressure and electronic throttle position, during a transition from a ten cylinder operating mode to a five cylinder operating mode.

FIG. 4 shows the throttle position, manifold pressure, variable camshaft timing schedule, and the spark advance for both the variable displacement engine bank and the non-variable displacement engine bank. In the case of the engine schematically shown in FIG. 1b, a single throttle valve 30 is used to control air supply to a common air intake plenum for each cylinder bank. In the case of the engine schematically shown in FIG. 1c, the variable displacement cylinder bank and the non-variable displacement cylinder bank have separate intake air plenums with separate throttles 30' and 30", respectively.

Figure 1C:
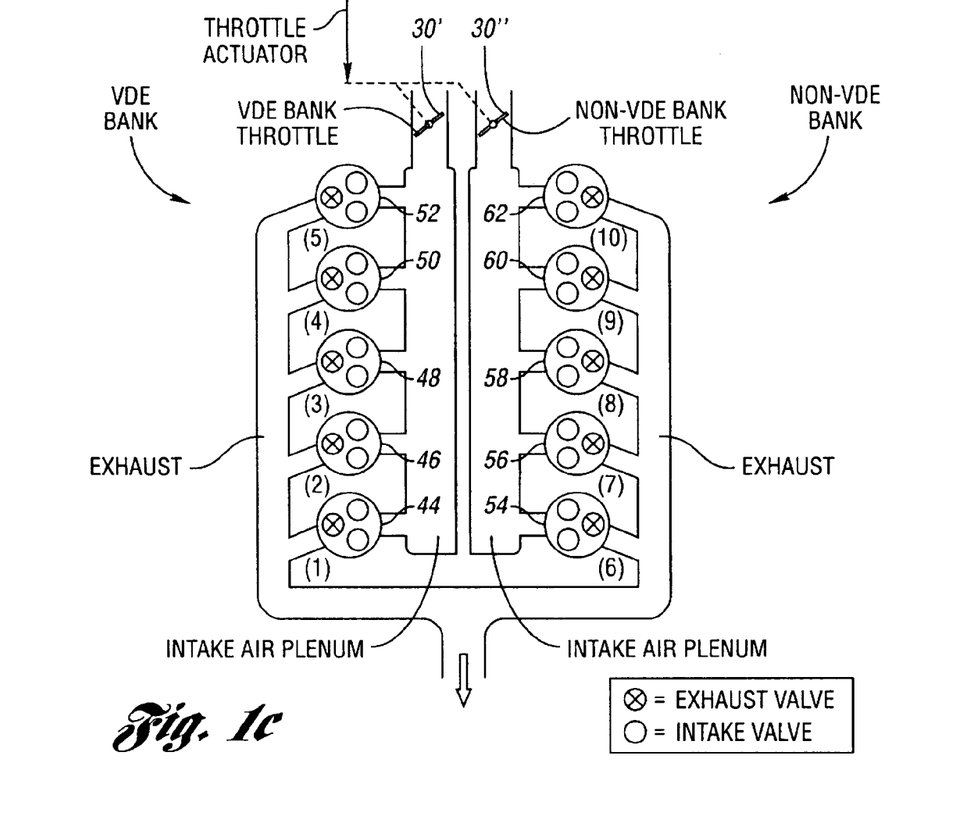
FIG. 1c is a schematic representation of a dual intake manifold and an exhaust manifold for a twin bank engine of the kind shown in FIG. 1b.

The engine of FIG. 1c may have common throttle control shaft for the separate throttle valves 30' and 30", so the throttle position is identical for both banks. The engine of FIG. 1c, with its separate air induction systems, makes it possible for each bank to have a unique map level.

It will be assumed for purposes of this description that the torque demanded by the operator is constant, as shown at 64 in FIG. 3. When the transition region is entered, the throttle is opened to increase air flow and torque at the non-variable displacement engine bank. This is shown at 66 in FIG. 4. The non-variable displacement engine bank camshaft timing changes smoothly to its post-transition value. This is shown at 68 in FIG. 4. Simultaneously, the spark is retarded to reduce any torque scheduling errors caused by limitations in the control of the minimum variable displacement bank torque output under firing conditions. This variation in spark retard is shown at 70 in FIG. 4. Further, the variable camshaft timing and spark timing for the variable displacement engine bank are retarded, as shown at 72 and 74, respectively. This reduces the air flow and torque as much as possible. The variable camshaft timing for the variable displacement bank is moved to full retard at the end of the transition region, which is the position required for minimum fuel consumption using the intake cam phasing technique for variable displacement engines.

During the transition, the variable camshaft timing, shown at 72 in FIG. 4, should be phased very early in the torque control region. Further, it should be completed before the beginning of the deactivation region. This will avoid a condition in which air is compressed in the cylinders and then rapidly expanded back into the intake manifold when the intake valves open. Engine noise and vibration is reduced in this way.

The torque on the non-variable displacement engine bank during the transition from ten cylinder operation to five cylinder operation is gradually increased by advancing intake valve cam timing, as shown at 76 in FIG. 3. Simultaneously, the torque is decreased on the variable displacement engine bank using cam phasing and spark retard, as shown at 78.

Figure 5:
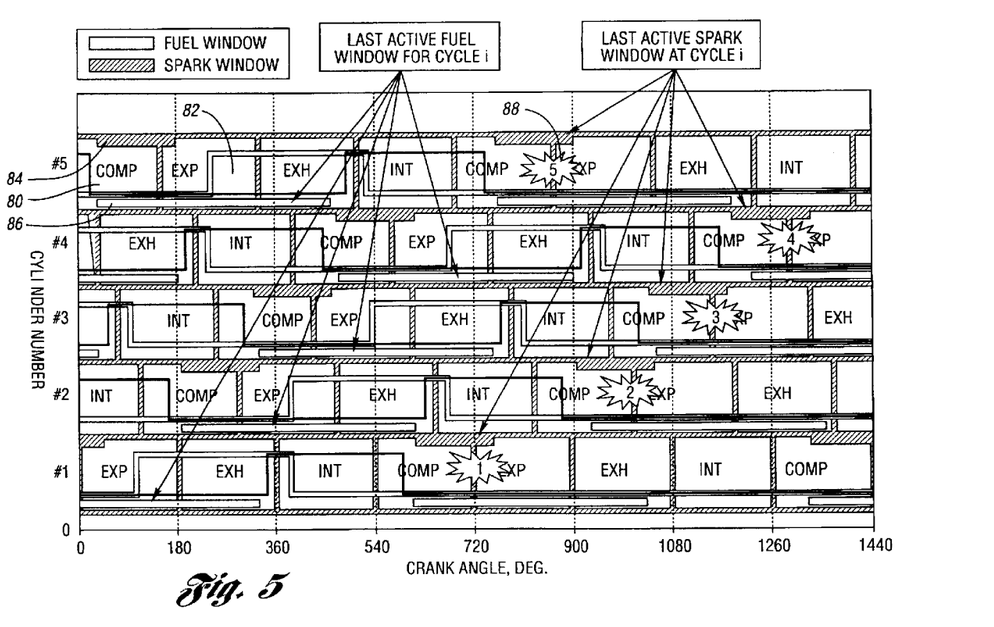
FIG. 5 is a variable displacement engine timing diagram for a conventional variable displacement engine cylinder deactivation sequence.
Figure 6:
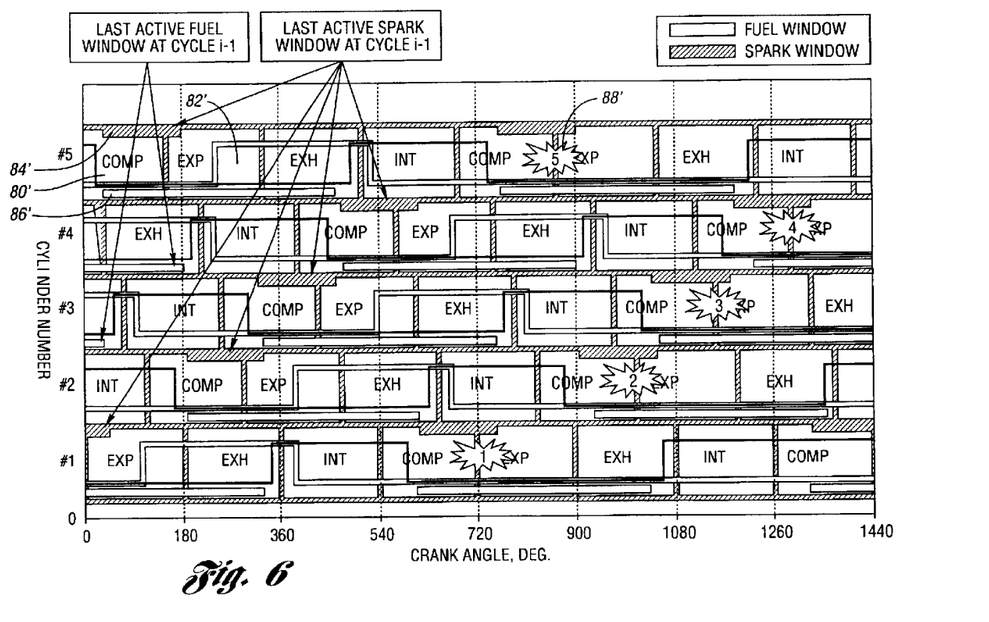
FIG. 6 is a variable displacement engine bank timing diagram for an engine incorporating the invention, which includes an intake cam phaser for the cylinder deactivation sequence.

The differences between the deactivation strategy for known variable displacement engines, where both the intake and exhaust valves are deactivated, and the technique of the present invention are illustrated in FIGS. 5 and 6. In the case of FIG. 5, the cylinder deactivation sequence for cylinders 1 through 5 of a known variable displacement engine is illustrated. The intake valve position is opened or closed, as shown by line 80, and the exhaust valve position for the known variable displacement engine cylinder deactivation sequence is shown by line 82. The lines 80 and 82 are either high or low. The low position corresponds to a closed valve and the high position corresponds to an open valve.

In FIG. 5, the spark window is shown at 84 and the fuel injection window is, shown at 86. The numbered star symbols, shown in FIG. 5, illustrate the crank angle at which the exhaust and intake valves are deactivated. For example, cylinder 5 is deactivated at about 900° of crank angle, as indicated at 88. This occurs at the last active spark window during an engine cycle "i".

The corresponding timing diagrams for cylinders 1, 2, 3, and 4 have similar notations corresponding to the notations for cylinder 5. In each case, the intake and exhaust valves are deactivated at the last active spark window during engine cycle "i". The cylinders for the known variable displacement engine of FIG. 5 are deactivated in the firing order 1-5-2-3-4.

Due to the actuator design, the valves must be closed to effect deactivation or reactivation. Therefore, the valves are deactivated near the top-dead-center of the compression stroke, where both the intake and exhaust valves are closed. Five separate control signals and drivers are used to activate each cylinder. In the system shown in FIG. 5, the variable displacement engine has its last active fuel window, where injectors are still active, and the last active spark window occurring in cycle "i", which is the first cycle where valve deactivation occurs. Thus, ignition and compression occur as normal during the compression and expansion strokes. This traps high pressure combusted gases in the cylinders.

In contrast to the timing diagram of FIG. 5, FIG. 6 shows the deactivation timing diagram for the variable displacement engine bank of the invention. Only the exhaust valve is deactivated in the case of FIG. 6, so the windows that are available for deactivation are wider and fewer control signals and drivers are needed. The exhaust valves are deactivated in the firing order of 1-5-2-3-4, as in the case of FIG. 5. Since the intake valves remain active, the fuel and spark are deactivated one engine cycle earlier in the case of FIG. 6 than in the case of FIG. 5. That is, the fuel and spark are deactivated at cycle "i"−1. This prevents ignition and combustion after the last active exhaust event. If combustion were to occur after the last active exhaust stroke, then a fraction of the residual gases would be pushed into the intake manifold during the operating mode transition. This would adversely affect combustion and performance in the non-variable displacement engine bank for an engine with a common intake air plenum, as in the case of FIG. 1*b*. It would affect performance also in the case of an engine with a separate intake air plenum for each bank, as shown in FIG. 1*c*, because residual exhaust gases would be pushed into the intake air plenum for the variable displacement engine bank where the gases would be stored until the next engine cycle. At the intake stroke of the next engine cycle for the variable displacement bank, the residual exhaust gases would be drawn into the intake valve, which could upset the fuel-air ratio and cause misfiring.

The reference numerals used in FIG. 6 correspond to the reference numerals used in FIG. 5, although they carry prime notations. It should be noted, however, that the events that are designated by the numerals 80, 82, 84, and 86 in FIG. 5 occur one cycle earlier than the corresponding events shown in the timing diagram of FIG. 6.

In a transition from the five cylinder operating mode to the 10 cylinder operating mode, the transition would be essentially a reverse image of the transition from the ten cylinder operating mode to the five cylinder operating mode previously described. That is, the cylinders are first reactivated with variable camshaft timing and spark retard. Then the throttle position is reduced to ramp down the air flow and the torque on the non-variable displacement engine bank. At the same time, the spark and the variable camshaft timing are advanced to ramp up the variable displacement engine bank torque. Thus, the five cylinder to ten cylinder transition consists of a reactivation region, followed by a torque control region.

Figure 7:
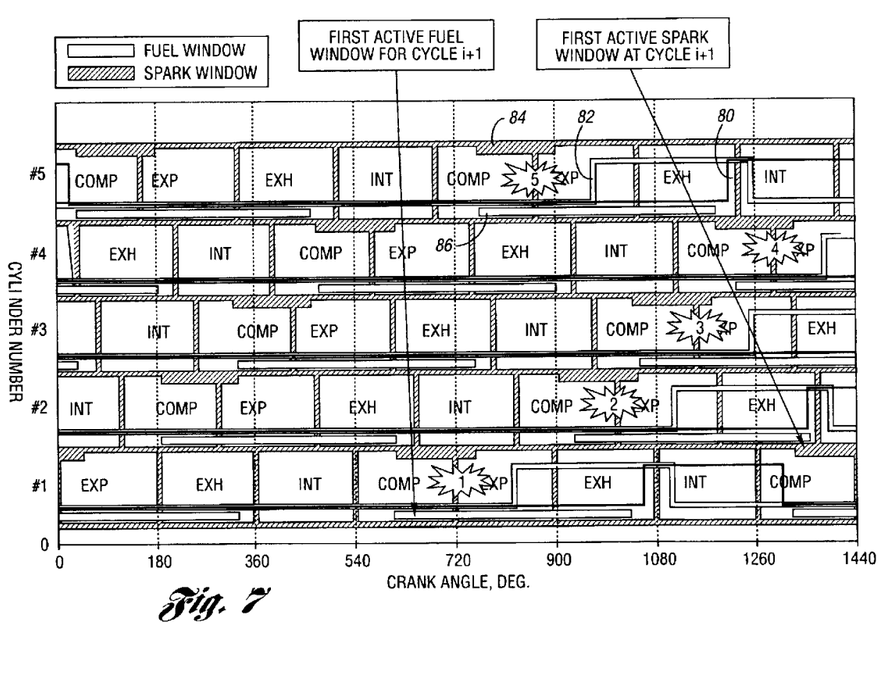
FIG. 7 is a variable displacement engine bank timing diagram for a conventional variable displacement engine reactivation sequence.
Figure 8:
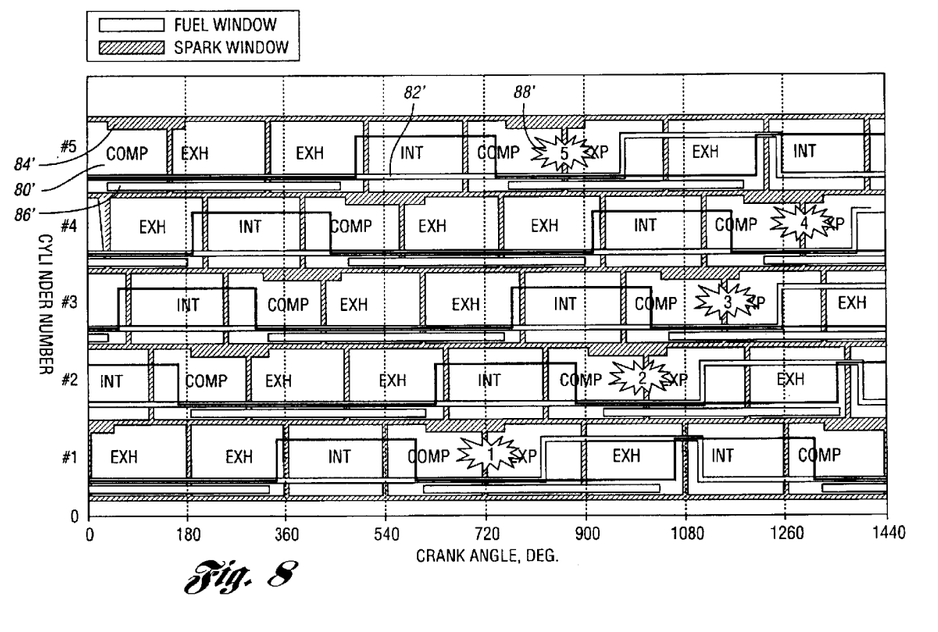
FIG. 8 is a variable displacement engine bank timing diagram for an engine incorporating the invention, which includes an intake cam phaser for a cylinder reactivation sequence.

The differences between the sequence of FIGS. 7 and 8 during a five cylinder to ten cylinder transition are in the reactivation region. FIGS. 7 and 8 illustrate, respectively, the reactivation sequences for the known variable displacement engine and an engine embodying the present invention. In the case of FIG. 7, the cylinders are reactivated in the firing order. The variable displacement engine fuel and spark are reactivated for the next induction and compression strokes, respectively. That is, they are reactivated for cycle "i"+1. The combustion gases that were trapped in the cylinders during deactivation are then pushed into the exhaust and the cylinders are ready to begin firing. In the case of FIG. 8, the exhaust valves likewise are reactivated in the firing order indicated above. Since the intake valves are active, the fuel and spark are reactivated one cycle earlier than in the case of FIG. 7. That is, they are reactivated at cycle "i". This provides ignition and combustion prior to the first active exhaust event. If fuel injection and spark were to be delayed until the next cycle, air would be pushed into the exhaust manifold. That would negatively affect the air-fuel ratio and the performance of the catalyst in a catalytic converter for the engine.

In summary, the objectives of the invention are achieved during both deactivation and reactivation. No exhaust is discharged into the intake; and during reactivation, and no air is discharged into the exhaust. Deactivation is characterized by deactivating fuel and spark at cycle "i"−1. The exhaust valve is deactivated at cycle "i". Further, in the case of reactivation, spark and fuel are deactivated during cycle "i", and the exhaust valve is deactivated during cycle "i"+1.

Although an embodiment of the invention has been described, it will be apparent to persons skilled in the art that modifications may be made without departing from the scope of the invention. All such modifications and equivalents thereof are intended to be covered by the following claims.

What is claimed is:

1. A method for controlling a variable displacement, multiple-cylinder, four-stroke cycle, spark-controlled, fuel injected internal combustion engine, the engine having at least one variable displacement cylinder and one non-variable displacement cylinder, each cylinder having a piston, an exhaust valve and at least one air intake valve, a camshaft driven actuator for the intake valve for the variable displacement cylinder, a camshaft driven actuator for the exhaust valve for the variable displacement cylinder, a camshaft driven actuator for the exhaust valve for the non-variable displacement cylinder, and a throttle-controlled air induction system for the cylinders, the method comprising the steps of:

effecting a transition between a first operating mode in which both the variable displacement cylinder and the non-variable displacement cylinder are active and a second operating mode in which only the non-variable displacement cylinder is active;

retarding timing of the intake valve closing event for the variable displacement cylinder and the intake valve opening event for the variable displacement cylinder so that the events are approximately equidistant from a top-dead-center position of the piston during the transition, whereby net friction and air pumping losses are minimized;

increasing throttle opening to increase torque of the non-variable displacement cylinder;

advancing camshaft timing to increase torque for the non-variable displacement cylinder during the transition while simultaneously retarding camshaft timing and spark timing to reduce torque for the variable displacement cylinder; and deactivating the exhaust valve, fuel injector and spark for the variable displacement cylinder during a deactivation region of the transition, the deactivation occurring during one full cycle of the engine, the torque increase and the torque decrease during the transition occurring during a torque control region of the transition in advance of the deactivation.

2. The method set forth in claim 1 wherein the variable displacement engine comprises a first bank of variable displacement cylinders and a second bank of non-variable displacement cylinders;

the advancement of camshaft timing to increase torque and the retarding of camshaft and spark timing to decrease torque occurring for all cylinders in the first bank;

the increase in throttle opening to increase torque occurring for all cylinders in the second bank during the transition.

3. The method set forth in claim 2 wherein the deactivation of camshaft, fuel injectors and spark retarding to reduce torque occurs for all cylinders in the first bank.

4. The method set forth in claim 3 wherein the deactivation of the cylinders occurs in a sequence corresponding to a pre-selected firing order for the cylinders in the first bank.

5. The method set forth in claim 2 wherein the engine has a common intake air induction system with a common throttle valve in communication with the intake valves for the variable displacement cylinders and the non-variable displacement cylinders.

6. The method set forth in claim 2 wherein the cylinders of each bank have separate induction systems, each induction system having a separate throttle valve, each throttle valve being connected to a common throttle valve actuator.

7. The method set forth in claim 2 wherein the intake valves for the first bank of cylinders remain active during the transition between the first and second operating modes while the exhaust valves are deactivated.

8. A method for controlling a variable displacement, multiple-cylinder, four-stroke cycle, spark-controlled, fuel injected internal combustion engine, the engine having at least one variable displacement cylinder and one non-variable displacement cylinder, each cylinder having a piston, an exhaust valve and at least one air intake valve, a camshaft driven actuator for the intake valve for the variable displacement cylinder, a camshaft driven actuator for the exhaust valve for the variable displacement cylinder, a camshaft driven actuator for the exhaust valve for the non-variable displacement cylinder, and a throttle-controlled air induction system for the cylinders, the method comprising the steps of:

effecting a transition from a first operating mode in which only the non-variable displacement cylinder is active to a second operating mode in which both cylinders are active;

decreasing the throttle opening to decrease torque of the non-variable displacement cylinder;

retarding camshaft timing to decrease torque for the non-variable displacement cylinder during the transition while simultaneously advancing camshaft timing and spark timing to increase torque for the variable displacement cylinder;

activating the exhaust valve, fuel injector and spark for the variable displacement cylinder during the transition from the first operating mode to the second operating mode; and retarding the timing of the intake valve closing event and the intake valve opening event so that the events are approximately equidistant from a top dead center position of the piston during the transition as the deactivated cylinders are reactivated, whereby friction and air pumping losses are minimized;

the torque increase of the variable displacement cylinder and the torque decrease of the non-variable displacement cylinder during the transition occurring during a torque control region of the transition, preceded by a reactivation region of the transition in which the exhaust valve, fuel injector and spark advance for the variable displacement cylinder are reactivated.

9. The method set forth in claim 2 wherein the exhaust valve for each cylinder in the bank of variable displacement cylinders is deactivated during the transition to the second operating mode in the engine cycle following spark retarding and fuel injector deactivation in the immediately preceding engine cycle.

10. The method set forth in claim 8 wherein the exhaust valve for each cylinder in the bank of variable displacement cylinders is reactivated during the transition to the first operating mode in the engine cycle in which the exhaust valve is reactivated.

11. A method for controlling a variable displacement, multiple-cylinder, four-stroke cycle, spark-controlled, fuel injected internal combustion engine, the engine having at least one variable displacement cylinder and one non-variable displacement cylinder, each cylinder having a piston, an exhaust valve and at least one air intake valve, a camshaft driven actuator for the intake valve of the variable displacement cylinder, a camshaft driven actuator for the exhaust valve for the variable displacement cylinder, a camshaft driven actuator for the exhaust valve for the non-variable displacement cylinder, a throttle-controlled air induction system for the cylinders, the method comprising the steps of:

effecting a transition between a first operating mode in which both the variable displacement cylinder and the non-variable displacement cylinder are active and a second operating mode in which only the non-variable displacement cylinder is active;

increasing throttle opening to increase torque of the non-variable displacement cylinder;

advancing camshaft timing to increase torque for the non-variable displacement cylinder during the transition while simultaneously retarding camshaft timing and spark timing to reduce torque for the variable displacement cylinder; and deactivating the exhaust valve, fuel injector and spark for the variable displacement cylinder during a deactivation region of the transition, the deactivation occurring during one full cycle of the engine, the torque increase and the torque decrease during the transition occurring during a torque control region of the transition in advance of the deactivation.

12. The method set forth in claim 11 wherein the variable displacement engine comprises a first bank of variable displacement cylinders and a second bank of non-variable displacement cylinders;

the advancement of camshaft timing to increase torque and the retarding of camshaft and spark timing to decrease torque occurring for all cylinders in the first bank;

the increase in throttle opening to increase torque occurring for all cylinders in the second bank during the transition.

13. The method set forth in claim 12 wherein the deactivation of camshaft, fuel injectors and spark retarding to reduce torque occurs for all cylinders in the first bank.

14. The method set forth in claim 13 wherein the deactivation of the cylinders occurs in a sequence corresponding to a pre-selected firing order for the cylinders in the first bank.

15. The method set forth in claim 12 wherein the engine has a common intake air induction system with a common throttle valve in communication with the intake valves for the variable displacement cylinders and the non-variable displacement cylinders.

16. The method set forth in claim 12 wherein the cylinders of each bank have separate induction systems, each induction system having a separate throttle valve, each throttle valve being connected to a common throttle valve actuator.

17. The method set forth in claim 12 wherein the intake valves for the first bank of cylinders remain active during the transition between the first and second operating modes while the exhaust valves are deactivated.

18. A method for controlling a variable displacement, multiple-cylinder, four-stroke cycle, spark-controlled, fuel injected internal combustion engine, the engine having at least one variable displacement cylinder and one non-variable displacement cylinder, each cylinder having a piston, an exhaust valve and at least one air intake valve, a camshaft driven actuator for the intake valve for the variable displacement cylinder, a camshaft driven actuator for the exhaust valve for the variable displacement cylinder, a camshaft driven actuator for the exhaust valve for the non-variable displacement cylinder, a throttle-controlled air induction system for the cylinders, the method comprising the steps of:

effecting a transition from a first operating mode in which only the non-variable displacement cylinder is active to a second operating mode in which both cylinders are active;

decreasing the throttle opening to decrease torque of the non-variable displacement cylinder;

retarding camshaft timing to decrease torque for the non-variable displacement cylinder during the transition while simultaneously advancing camshaft timing and spark timing to increase torque for the variable displacement cylinder; and activating the exhaust valve, fuel injector and spark for the variable displacement cylinder during the transition from the first operating mode to the second operating mode;

the torque increase of the variable displacement cylinder and the torque decrease of the non-variable displacement cylinder during the transition occurring during a torque control region of the transition, preceded by a reactivation region of the transition in which the exhaust valve, fuel injector and spark advance for the variable displacement cylinder are reactivated.

19. The method set forth in claim 12 wherein the exhaust valve for each cylinder in the bank of variable displacement cylinders is deactivated during the transition to the second operating mode in the engine cycle following spark retarding and fuel injector deactivation in the immediately preceding engine cycle.

20. The method set forth in claim 18 wherein the variable displacement engine comprises a first bank of variable displacement cylinders and a second bank of non-variable displacement cylinders, the exhaust valve for each cylinder in the bank of variable displacement cylinders being reactivated during the transition to the first operating mode in the engine cycle in which the exhaust valve is reactivated.

21. An engine control system for a variable displacement, multiple-cylinder, four-stroke cycle, spark-controlled, fuel-injected, internal combustion engine having at least one variable displacement cylinder and one non-variable displacement cylinder, each cylinder having a piston, an exhaust valve and at least one air intake valve;

a camshaft-driven actuator for the intake valve of the variable displacement cylinder;

a camshaft-driven actuator for the exhaust valve for the variable displacement cylinder, a camshaft-driven exhaust valve for the non-variable displacement cylinder;

a throttle controlled air induction system for the cylinders;

an engine controller for controlling fuel injection, spark retard, throttle and camshaft timing, the controller including a digital processor and a memory with a stored control algorithm;

the controller being programmed in accordance with the algorithm to effect a transition between a first operating mode in which both the variable displacement cylinder and the non-variable displacement cylinder are active and a second operating mode in which only the non-variable displacement cylinder is active;

the controller increasing throttle opening to increase torque of the non-variable displacement cylinder;

the camshaft timing being advanced by the controller to increase torque of the non-variable displacement cylinder during the transition while simultaneously retarding camshaft timing to reduce torque for the variable displacement cylinder;

the exhaust valve, the fuel injector and spark for the variable displacement cylinder being deactivated during a deactivation region of the transition, the torque decrease and the torque increase and during the transition occurring during a torque control region of the transition in advance of the deactivation.

22. The engine control system set forth in claim 21 wherein the variable displacement engine comprises a first bank of variable displacement cylinders, and a second bank of non-variable displacement cylinders;

the advancement of camshaft timing to increase torque and the retarding of camshaft and spark timing to decrease torque occurring for all cylinders in the first bank;

the increase in throttle opening to increase torque occurring in the first bank and the second bank during the transition.

23. An engine control system for a variable displacement, multiple-cylinder, four-stroke cycle, spark-controlled, fuel injected, internal combustion engine having at least one variable displacement cylinder and one non-variable displacement cylinder, each cylinder having a piston, an exhaust valve and at least one air intake valve;

a camshaft-driven actuator for the intake valve of the variable displacement cylinder;

a camshaft-driven actuator for the exhaust valve for the variable displacement cylinder;

a camshaft-driven actuator for the exhaust valve for the non-variable displacement cylinder;

a throttle-controlled air induction system for the cylinders;

an engine controller for controlling fuel injection, spark retard, throttle and camshaft timing, the controller including a digital processor and a memory with a stored control algorithm;

the controller being programmed in accordance with the algorithm to effect a transition between a first operating mode in which only the non-variable displacement cylinder is active and a second operating mode in which both the variable displacement cylinder and the non-variable displacement cylinder are active;

the controller decreasing throttle opening to decrease torque of the nonvariable displacement cylinder;

the camshaft timing being retarded by the controller to decrease torque of the non-variable displacement cylinder during the transition while simultaneously advancing camshaft timing to increase torque for the variable displacement cylinder;

the controller activating the exhaust valve, fuel injector and spark for the variable displacement cylinder during the transition from the first operating mode to the second operating mode;

the torque increase of the variable displacement cylinder and the torque decrease of the non-variable displacement cylinder during the transition occurring during a torque control region of the transition, preceded by a reactivation region of the transition in which the exhaust valve, fuel injector and spark advance for the variable displacement cylinder are reactivated.

* * * * *